United States Patent [19]
Whitney et al.

[11] Patent Number: 5,266,044
[45] Date of Patent: Nov. 30, 1993

[54] PRE-BUSSED RIGID CONDUIT

[76] Inventors: Robert I. Whitney, 16170 Saint Mary's Rd., Brookville, Ind. 47012; Lisa C. Simmering, 35 Kelly Dr., Oxford, Ohio 45056; Glenn S. O'Nan, 788 Franklin St., Hamilton, Ohio 45013

[21] Appl. No.: 912,071

[22] Filed: Jul. 8, 1992

Related U.S. Application Data

[63] Continuation of Ser. No. 675,389, Mar. 26, 1991, abandoned.

[51] Int. Cl.⁵ ............................................. H01R 4/60
[52] U.S. Cl. ..................................... 439/210; 439/115
[58] Field of Search .............................. 439/190-204, 439/207, 210, 271-275, 624, 654, 162-164, 115

[56] References Cited

U.S. PATENT DOCUMENTS

| | | | |
|---|---|---|---|
| 1,843,671 | 2/1932 | Guttman et al. | 439/210 |
| 2,009,376 | 7/1935 | Frank . | |
| 2,058,921 | 10/1936 | Steimel | 174/167 |
| 2,162,864 | 6/1939 | Rugg et al. . | |
| 3,005,037 | 10/1961 | Miller, Sr. | 439/210 |
| 3,383,456 | 5/1968 | Kosak . | |
| 3,871,734 | 3/1975 | Murtland | 439/276 |
| 3,956,575 | 5/1976 | Sutherland | 174/72 R |
| 4,084,875 | 4/1978 | Yamamoto | 439/274 |
| 4,154,302 | 5/1979 | Cugini | 439/271 |
| 4,420,210 | 12/1983 | Karol et al. | 439/271 |
| 4,571,450 | 2/1986 | Duffy . | |
| 4,875,871 | 10/1989 | Booty, Sr. et al. . | |

FOREIGN PATENT DOCUMENTS 1292078 3/1962 France .
0148130 7/1985 United Kingdom .

Primary Examiner—David L. Pirlot
Attorney, Agent, or Firm—Larry I. Golden; David R. Stacey

[57] ABSTRACT

A sectionalized electrical distribution feeder system for carrying electrical power from a source point to a use point or a distribution point. Each section of the distribution system includes a substantially cylindrical enclosure capable of being easily cut with a hand saw. The enclosure also provides support and protection from physical damage to a plurality of electrical conductors which are disposed within the enclosure. The conductors are held firmly in place by a number of electrically insulating supports which snugly fit inside the enclosure. Each conductor can be easily cut with a metal cutting hand saw, and is enclosed in an electrically insulating sheath which can be removed from a newly cut end to provide a contact surface. A joint connecting member is provided for electrically connecting the conductors of adjacent sections of the electrical distribution feeder system. A joint cover connects the two adjacent enclosures together and provides additional protection for the joint connecting member.

12 Claims, 9 Drawing Sheets

PRE-BUSSED RIGID CONDUIT

This application is a continuation of U.S. Ser. No. 675,389, filed Mar. 26, 1991, now abandoned.

FIELD OF THE INVENTION

The technical field to which this invention pertains is electrical distribution feeder systems for use in industrial and commercial locations.

BACKGROUND OF THE INVENTION

In the past, industrial and commercial electrical distribution feeder systems have generally employed cable and conduit, cable and cable tray, cable and wireway, or electrical busway. Where cable is used with conduit, the conduit must first be installed and then cables are pulled through it to complete the installation. Cable used with cable tray or wireway again involves the installation of the cable tray or wireway first and then laying of cables in the tray or wireway to complete the installation. Busway installations are generally simpler than cable and conduit or cable and tray or wireway since the conductors are already inside the protective enclosure and require no additional labor after the enclosure is installed. Busway designs of the past have generally included a number of bus bars having a rectangularly-shaped cross-section placed parallel to one another in a common plane and installed in a rectangularly shaped enclosure. The sections of busway are produced in specific lengths which can not be altered in the field during installation. For this reason, if special lengths are required they must be engineered and manufactured at the factory. This special engineering and manufacturing requires additional time for shipment to the job site and generally an increase in cost to the customer.

SUMMARY OF THE INVENTION

The present invention provides an alternative to cable and conduit, cable and tray, and busway designs for electrical feeder systems, particularly in the ampacity range of approximately 60 to 800 amperes.

In one embodiment of the present invention, an electrical feeder system includes one or more lengths of a generally cylindrical tubular enclosure which can be similar in construction to conventional metallic conduit. Disposed within the enclosure are a plurality of substantially rigid electrical conductors. End plugs are provided at each end of each length of enclosure for sealing the ends of the enclosure and supporting the conductors therein. The end plugs are made of an electrically insulating material and are dimensioned to be sealingly received within the ends of the lengths of enclosure. Longitudinal passageways are provided within the end plugs for tightly receiving each of the conductors. The passageways are spaced apart from each other and the inner wall of the enclosure to prevent physical and electrical contact between the conductors and between the conductors and the inner wall of the enclosure.

In a preferred embodiment of the present invention, longer lengths of the enclosure are provided with one or more support members disposed therein at longitudinally spaced apart locations. The support members are made of an electrically insulating material and are dimensioned to be slidably received within the enclosure. Similarly to the end plugs, the support members are provided with passageways dimensioned for tightly receiving and supporting the conductors at spaced apart locations whereby physical and electrical contact between the conductors and between the conductors and the inner wall of the enclosure is prevented.

The pre-bussed rigid conduit sectionalized electrical distribution system of the present invention is a combination of both conduit and busway. However, the system of the present invention has significant advantages over the prior art systems from which it was derived, particularly in the ampacity range of 60 to 800 amperes.

One advantage of the electrical distribution system of present invention is that the positioning of the conductors in the cylindrical enclosure permits a generally smaller and stronger enclosure than that usually employed in busway devices of the same current carrying capacity. The pre-bussed rigid conduit enclosure of the present invention is also generally smaller than that required for cable and conduit of the same current capacity.

Another advantage of the pre-bussed rigid conduit of the present invention is that it can be manufactured in specific lengths to facilitate easy handling and installation; however, unlike prior art busway systems, the pre-bussed rigid conduit of the present invention can be easily field modified with hand tools to lengths as short as 4 inches.

Yet another advantage of the present invention is that the enclosure can also provide a water resistant environment for the electrical conductors enclosed therein when assembled with standard waterproof electrical conduit fittings.

Other features and advantages of the invention will become apparent to those skilled in the art upon review of the following detailed description, claims and drawings.

Figure 1:
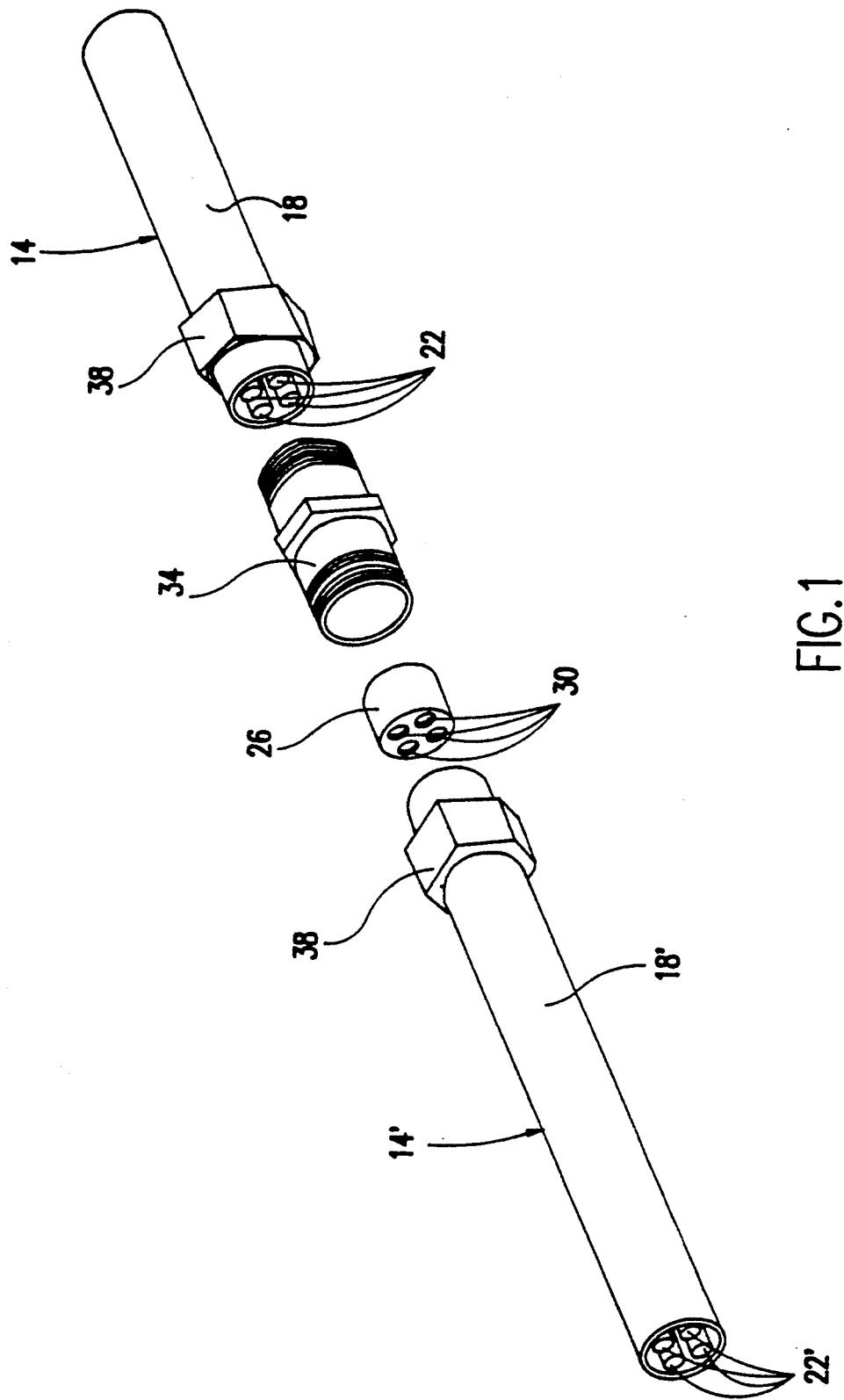
FIG. 1 is an isometric exploded view of two adjoining sections of the pre-bussed rigid conduit of the present invention.

Before one embodiment of the invention is explained in detail, it is to be understood that the invention is not limited in its application to the details of construction in the following description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

FIG. 1 illustrates one preferred embodiment of the pre-bussed rigid conduit sectionalized electrical distribution feeder system of the present invention. A first section 14 of pre-bussed rigid conduit includes an enclosure 18 and a plurality of electrical conductors 22. A second section 14' includes an enclosure 18' and a plurality of electrical conductors 22'. A joint connecting member 26 housing a number of substantially tubular electrical connectors 30 electrically connects the conductors 22 of the first section 14 with the conductors 22' of the second section 14'. A joint cover 34 and a pair of nuts 38 physically connect the enclosure 18 of the first section 14 to the enclosure 18' of the second section 14'. In the preferred embodiment, the enclosures 18 and 18' are constructed of metal, such as conventional metallic electrical conduit, and the joint cover 34 and nuts 38 comprise conventional electrical conduit fittings.

Figure 2:
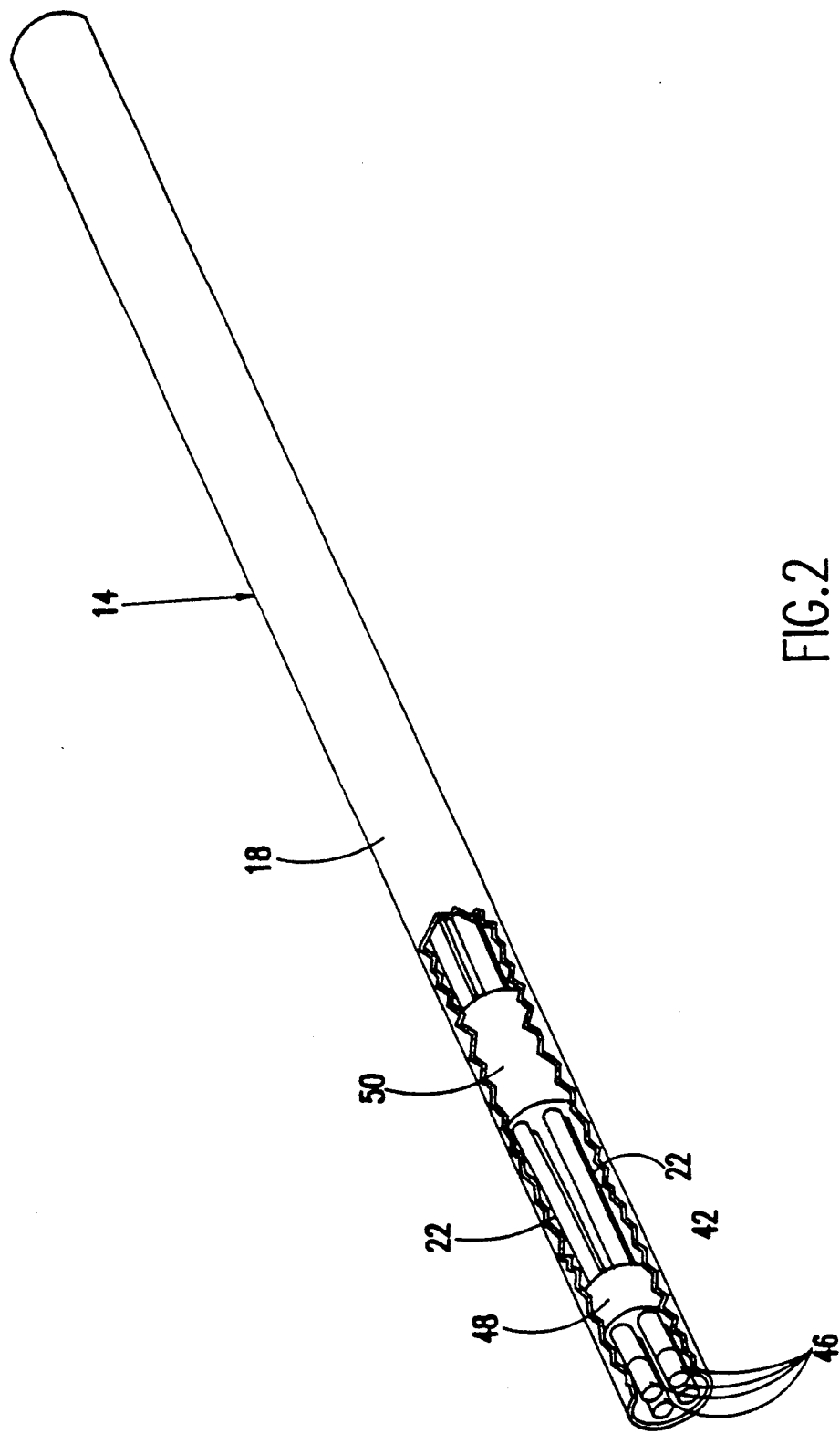
FIG. 2 is an isometric cut-away view of a section of the pre-bussed rigid conduit of the present invention.
Figure 3:
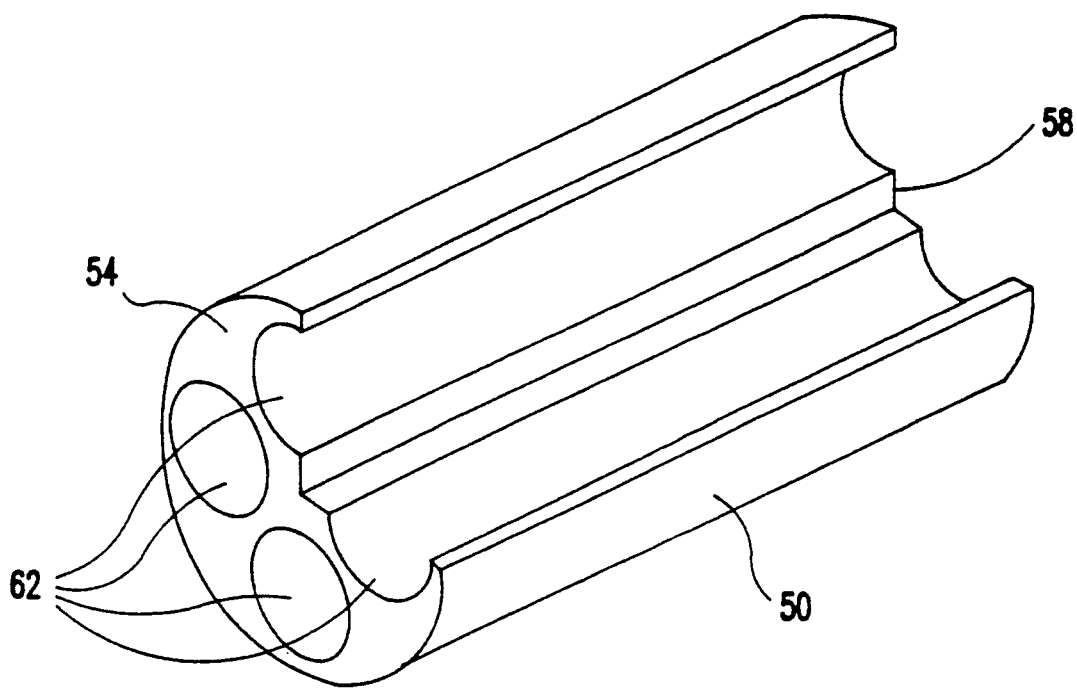
FIG. 3 is an isometric partial cross section view of an insulating support member for supporting the conductors within the enclosure of a pre-bussed rigid conduit system constructed in accordance with the present invention.

FIG. 2 illustrates the construction of a section 14 of a preferred embodiment of the pre-bussed rigid conduit of the present invention. Each conductor 22 is enclosed in an electrically insulating sheath 42. A portion of the sheath 42 is removed at each end 46 of the conductors 22 to provide an electrical contact surface. An end plug 48, made of electrically insulating material, such as a polymeric or thermoplastic material, is provided at each end of the section 14. The end plugs 48 are pressed into the enclosure 18 and fit tightly around the conductors 22 and within the enclosure 18, thereby sealing the enclosure 18. One or more support members 50, also made of an electrically insulating material, such as a polymeric or thermoplastic material, can be positioned at spaced apart intervals inside the enclosure 18 to support and maintain the physical and, more importantly, the electrical spacing of the conductors 22 inside the enclosure 18. The support members 50 fit snugly around the conductors 22 and easily slide inside the enclosure 18. Referring to FIG. 3, each support member 50 is generally cylindrical in shape and has a first end 54 and a second end 58. A number of passageways 62 run longitudinally through the support member 50 connecting the first end 54 with the second end 58. These passageways are dimensioned to tightly receive the electrical conductors 22.

Means for connecting adjacent sections, such as 14 and 14' shown in FIG. 1, at one of their ends is provided. For example, referring to FIG. 4, one embodiment of the joint connecting member 26 is illustrated which serves this function. The joint connecting member 26 has a first end 66 and a second end 70. A plurality of stepped passageways 74 extend longitudinally through the joint connecting member 26 for communication between the first end 66 and the second end 70. Each stepped passageway 74 has an inlet portion 78 extending inward from the first end 66 and the second end 70 and a connecting portion 82 which connects the inlet portions 78. The inlet portions 78 have a larger diameter than the connecting portion 82 providing a beveled step 86 at their intersection.

Figure 4:
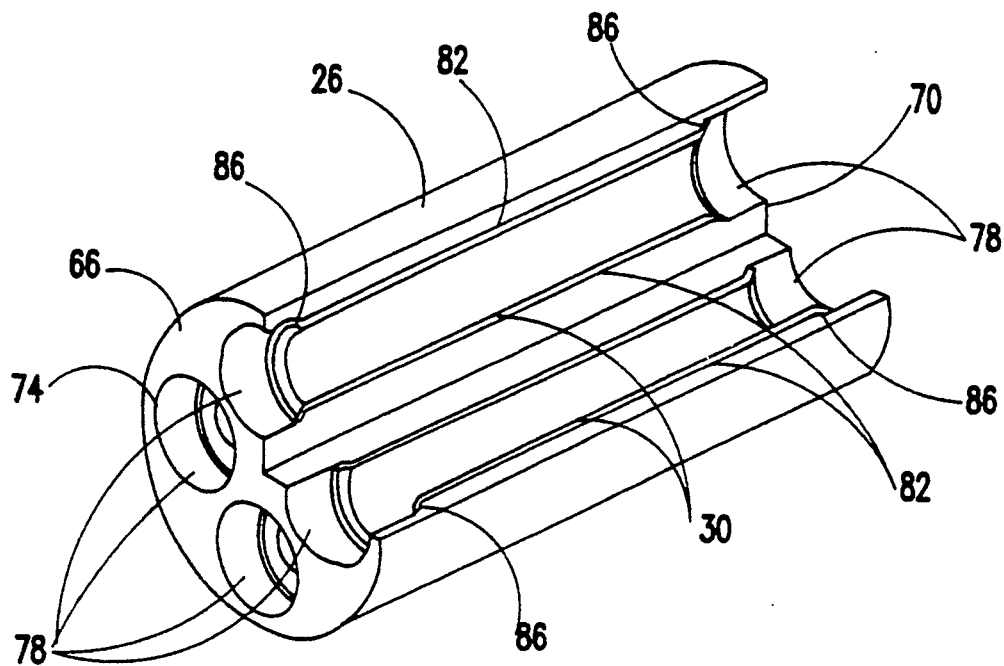
FIG. 4 is a partial cross section view of a joint connecting member for connecting two adjoining sections of pre-bussed rigid conduit constructed in accordance with the present invention.
Figure 5:
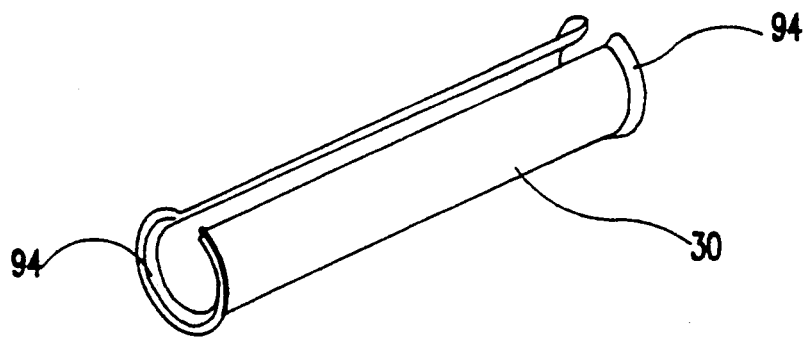
FIG. 5 is an isometric view of an electrical connector, normally disposed within the joint connecting member illustrated in FIG. 4, for facilitating electrical contact between corresponding conductors of two adjacent sections of pre-bussed rigid conduit constructed in accordance with the present.

Referring to FIG. 5, a tubular connector 30, having a C-shaped cross section, is dimensioned to be received within the connecting portion 82 of the stepped passageway 74 of the joint connecting member 26 shown in FIG. 4. Means for resisting longitudinal movement of the connector 30 within the passageways 74 of the joint connecting member 26 is provided by the ends 94 of the connector 30 being flared outward to engage the beveled step 86 of the stepped passageway 74. The flared ends 94 also facilitate insertion of the conductors 22 into the connectors 30.

Figure 9:
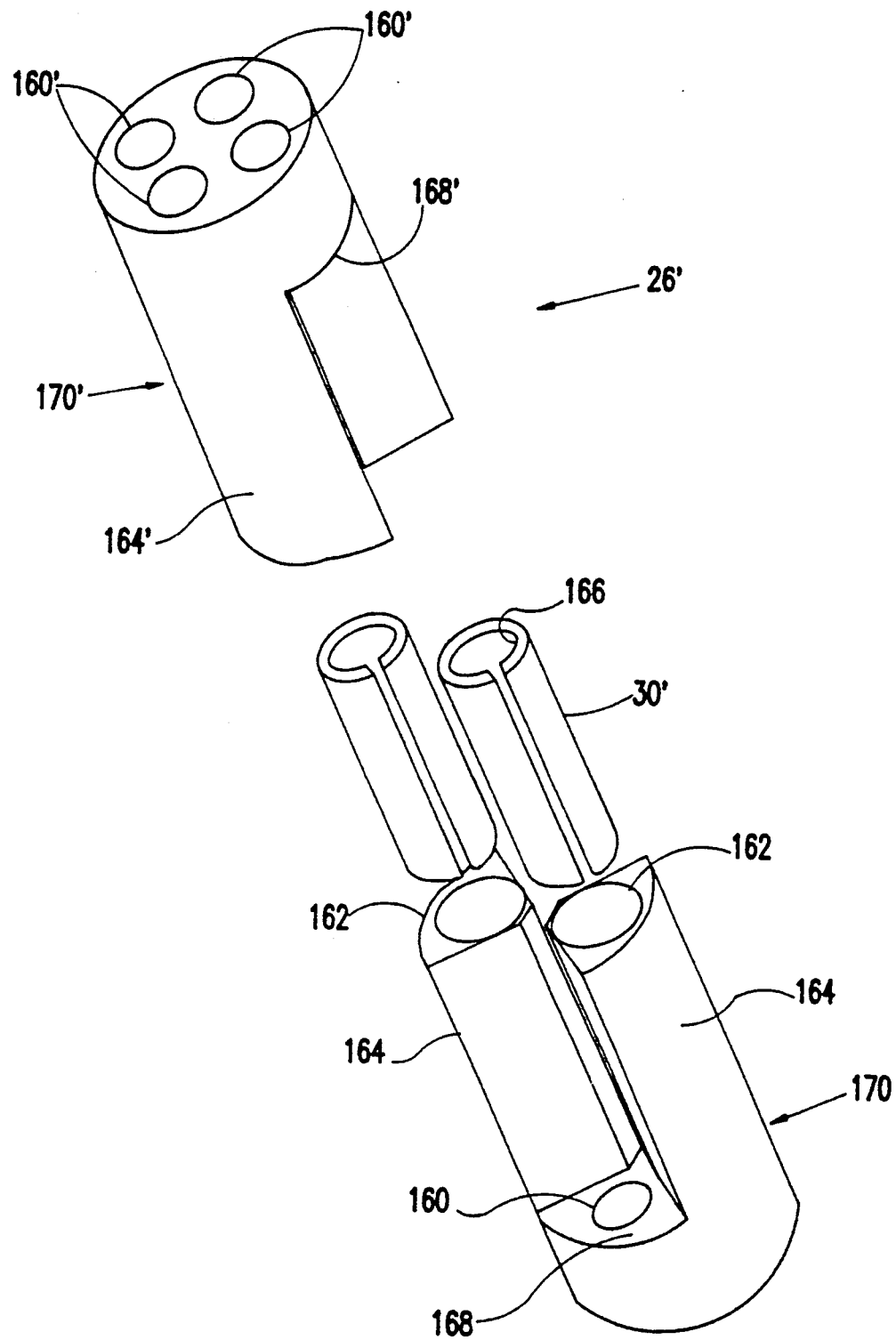
FIG. 9 is an exploded view of a joint connecting member constructed in accordance with one embodiment of the present invention.
Figure 10:
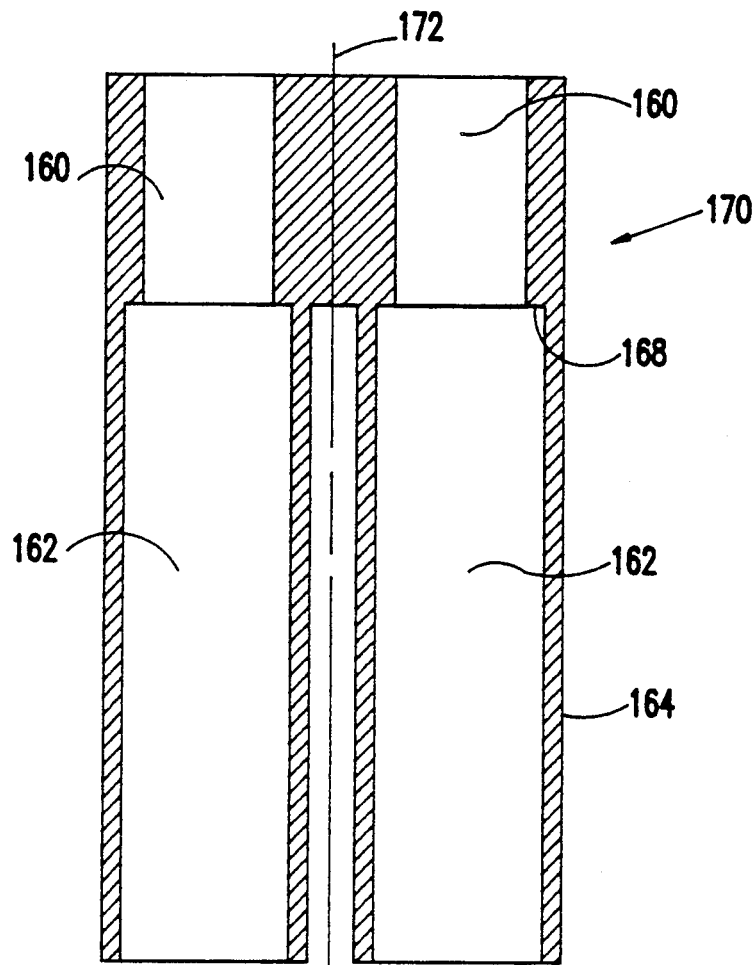
FIG. 10 is a cross-sectional view of one section of the joint connecting member illustrated in FIG. 9.
Figure 11:
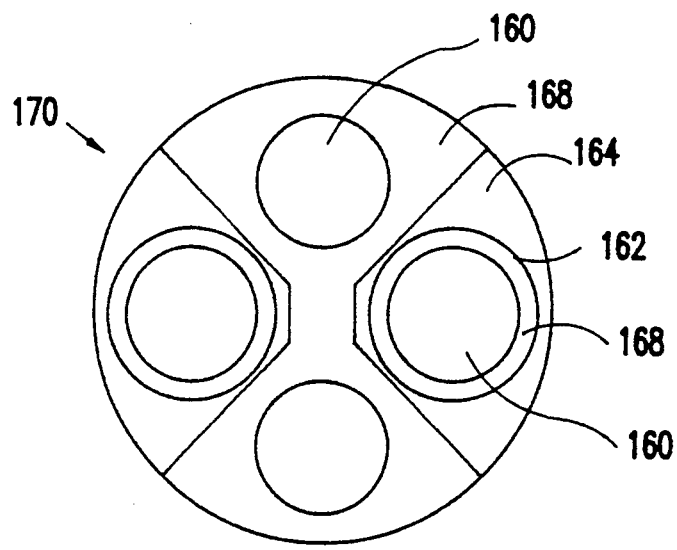
FIG. 11 is an end view of one section of the joint connecting member illustrated in FIG. 9.

Referring to FIG. 9, FIG. 10 AND FIG. 11, an alternate embodiment 26' of a joint connecting member for connecting two adjacent sections 14 and 14', as shown in FIG. 1, is illustrated. The joint connecting member 26' includes first and second substantially identical sections, 170 and 170' respectively, which interlock together to form a substantially cylindrical member. The first section 170 is provided with four passageways 160 for closely but slidably receiving the conductors 22 shown in FIG. 1. The first section 170 further includes a pair of substantially wedge-shaped, i.e. quarter-cylindrical, extensions 164, each having a substantially cylindrical passageway 162, which is concentric with one of the passageways 160, extending therethrough. The passageways 162 are dimensioned for tightly receiving a substantially cylindrical electrical connecter 30' having a C-shaped cross-section and an inner surface 166 which is dimensioned for tightly receiving the stripped end 46, as shown in FIG. 2, of one of the conductors 22. The C-shaped cross-section of the connector 30' permits it to be compressed slightly for pressing into the passageway 162 when the joint connecting member 26 is assembled and to expand slightly, pressing it tightly against the wall of the passageway 162 when the stripped end 46 of a conductor 22 is inserted into it when two sections 14 and 14' are joined together, as indicated in FIG. 1. The connector 30' is similar to the connector 30 shown in FIG. 5 and serves the same purpose except that it does not include the flare-shaped ends 94 of the connector 30. The connectors 30' are dimensioned (lengthwise) to be completely received within the corresponding passageway 162. It will be appreciated that the outer diameter of the connector 30' is greater than the diameter of the passageways 160. Accordingly, when the substantially identical first and second sections 170 and 170' are assembled together, with the connectors 30' installed in the corresponding passageways 162 and 162', to form the joint connecting member 26', longitudinal displacement of the connectors 30' will be substantially prevented by the surfaces 168 and 168' of the sections 170 and 170', respectively, which are perpendicular to the longitudinal (cylindrical) axis 172 of the member 26'. It will be appreciated by those skilled in the art that appropriate means, not shown in the drawing figures, for securing the first and second sections 170 and 170' together to form the member 26', such as an adhesive, will be provided.

Figure 6:
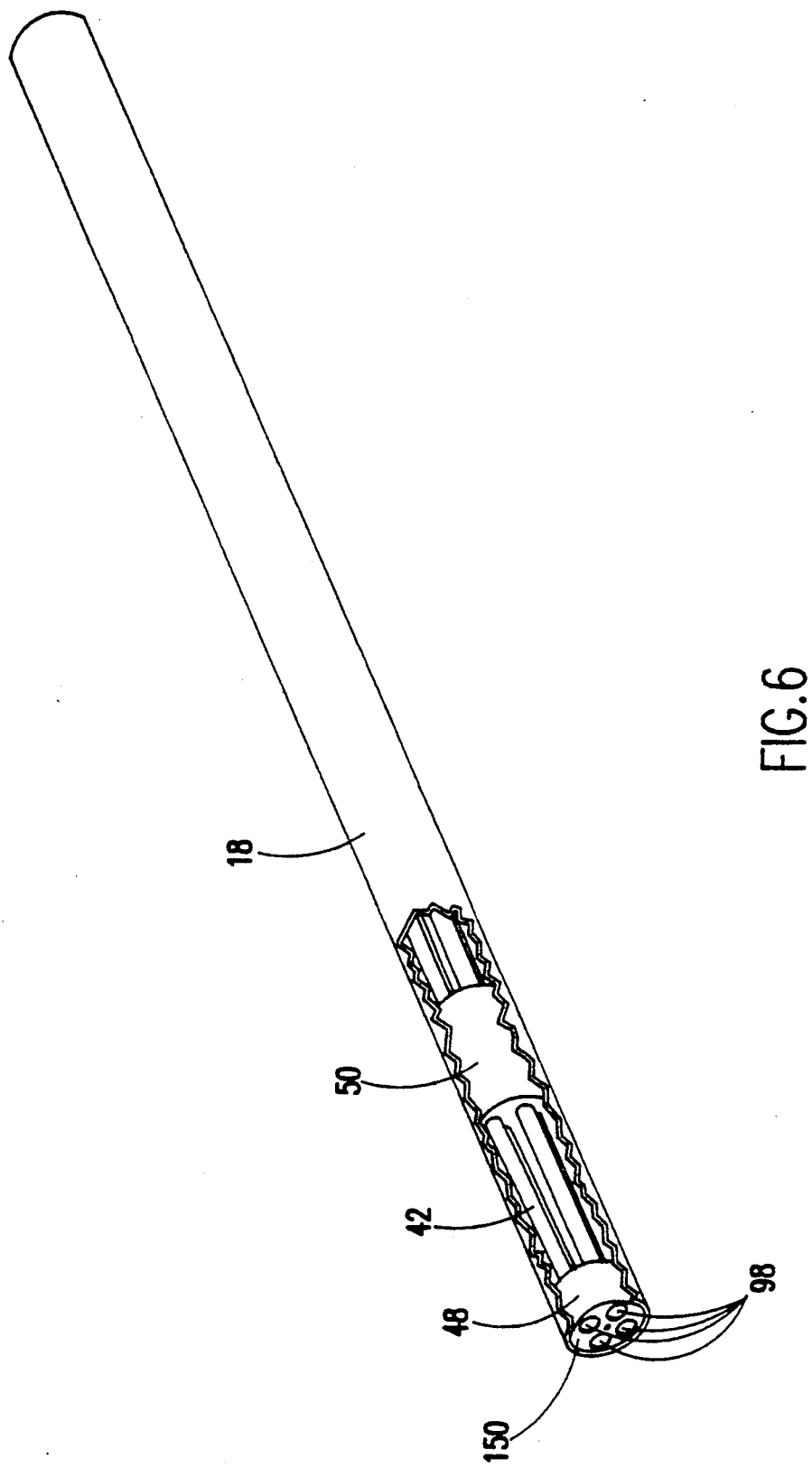
FIG. 6 is an isometric view of an alternate construction of the pre-bussed conduit of the present invention in which the electrical conductors are hollow.

One section of an alternate embodiment of the pre-bussed rigid conduit of the present invention wherein the electrical conductors 98 are tubular is shown in FIG. 6. The enclosure 18, conductor sheaths 42, end plugs 48, and support members 50 are the same as in the preferred embodiment shown in FIG. 2.

Figure 7:
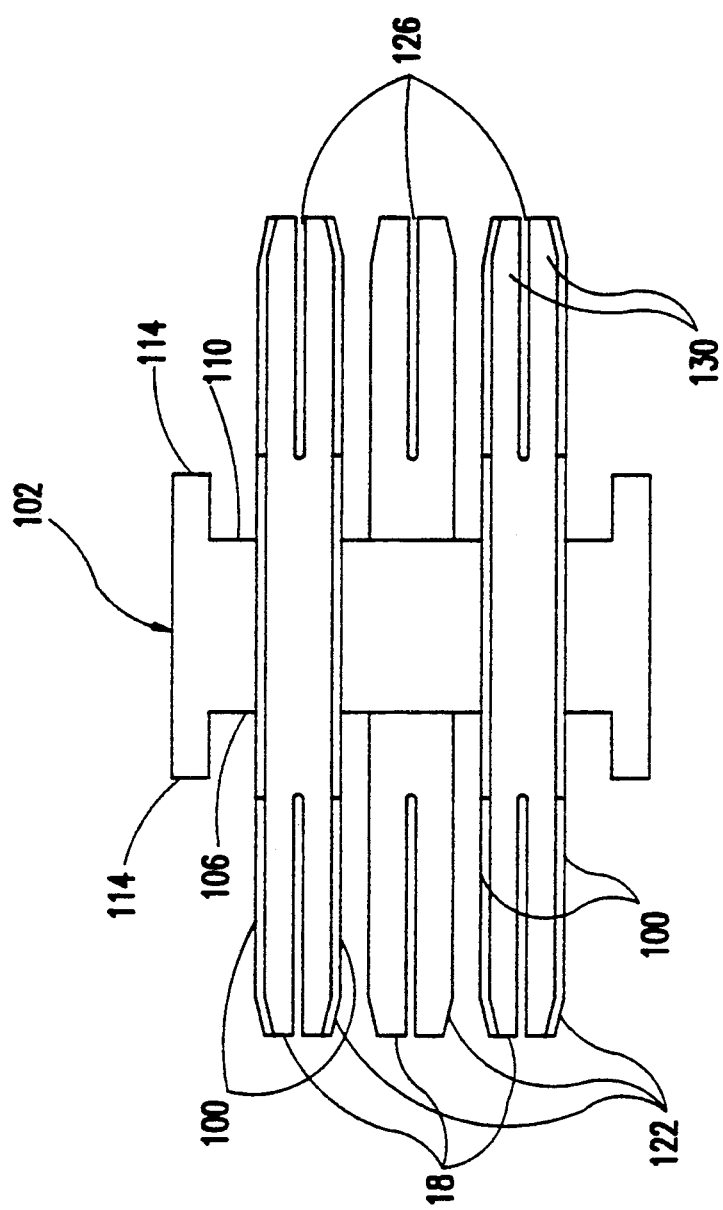
FIG. 7 is a cross sectional view of a joint connecting member for connecting two adjoining sections of pre-bussed rigid conduit constructed in accordance with the alternate construction of the present invention shown in FIG. 6, i.e. in which the electrical conductors are hollow.

FIG. 7 shows one embodiment of a joint connecting member 102 for joining two adjacent sections of pre-bussed rigid conduit of the embodiment of the present invention illustrated in FIG. 6. The joint connecting member 102 is cylindrical in shape and molded from an electrically insulating material, such as a polymeric or thermoplastic material, and has a first end 106 and a second end 110. An outer ring 114 extends outwardly from both the first and second ends, 106 and 110, respectively. The outer rings 114 slide over the outside of the enclosure 18. A number of electrical connectors 118, generally cylindrical in shape, are molded into the joint connecting member 102. Each connector 118 extends outwardly from both ends 106 and 110 respectively of the joint connecting member 102. Each connector 118 has a beveled end 122 for easier insertion of the connector 118 into the end of the tubular conductor 98. A smooth electrical contact surface 100 engages the inside of the tubular conductors 98. Each beveled end 122 has two slots 126, one perpendicular to the other, which run longitudinally inward from the beveled end 122. The longitudinal slots 126 divide the beveled end 122 into quarters 130. The longitudinal slots 126 permit the beveled end 122 to compress slightly when the connector 118 is inserted into a corresponding tubular conductor 98.

Figure 8:
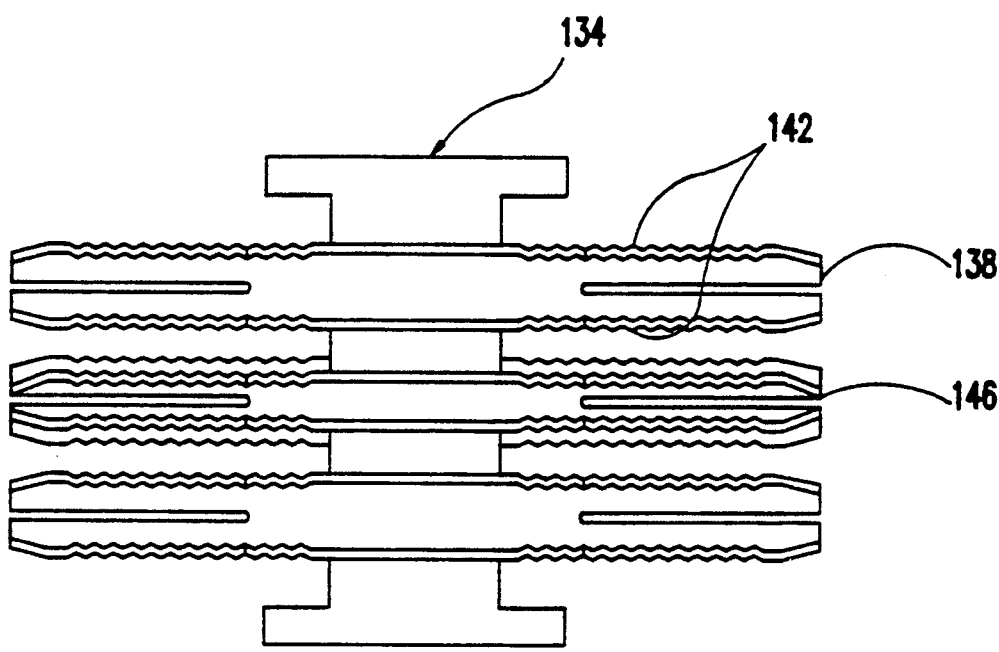
FIG. 8 is a cross sectional view of an alternate construction for a joint connecting member for connecting two adjoining sections of pre-bussed rigid conduit constructed in accordance with the alternate construction of the present invention shown in FIG. 6, i.e. in which the electrical conductors are hollow.

An alternate embodiment of joint connecting member 102' is shown in FIG. 8. The alternate joint connecting member 102' is similar in every respect to the joint connecting member 102 shown in FIG. 7 except that the connecters 118' have a ridged surface 142. Also shown in FIG. 8 is a ground connector 146 which is used when an internal ground conductor 150 is employed. When the internal ground conductor 150 is used, it is placed along the longitudinal axis of the enclosure 18 as shown in FIG. 6.

Although the present invention has been described in terms of specific embodiments, it is anticipated that alterations and modifications thereof will no doubt become apparent to those skilled in the art. For example, although the enclosures 18 of the preferred embodiment have been described as being similar to metallic electrical conduit, and in such embodiment the enclosure could be connected to ground and used as a neutral conductor, it will be understood that the enclosures 18 could be made of a nonconductive material and a neutral conductor, such as that indicated by the reference numeral 150 in FIG. 6 could be employed. It is therefore intended that the following claims be interpreted as covering all such alterations and modifications as fall within the true spirit and scope of the invention.

We claim:

1. A sectionalized electrical distribution feeder system having the capability of field modifiable length comprising:
    a plurality of adjoining sections of pre-bussed rigid conduit, each said section further comprising
        (a) a tubular enclosure, generally cylindrical in shape and having two ends,
        (b) a plurality of tubular electrical conductors disposed within said enclosure, and
        (c) a pair of end plugs for sealing said enclosure and supporting said conductors at said ends;
    means for connecting adjacent sections together at one of said ends of each adjacent section; said means for connecting further comprising
    a joint connecting member molded from an electrically insulating material, said joint connecting member having a generally cylindrical shape, a first end, a second end, and an outer ring extending outwardly from said first and second ends, said outer ring dimensioned for slidably receiving said enclosures; and
    a plurality of electrical connectors, each being generally cylindrical in shape, said joint connecting member being molded around the connectors whereby the connectors extend outward from said first and second ends of said joint connecting member parallel to the cylindrical axis of the joint connecting member, each of said connectors being dimensioned to be slidably received in one end of a corresponding one of said tubular conductors.

2. The system of claim 1 further comprising a joint cover, generally cylindrical in shape and dimensioned to slidably fit over the outside of said enclosure and said joint connecting member; and,
    means for securing said joint cover to said enclosure.

3. The system of claim 1 wherein each of said connectors further comprises:
    a beveled end for facilitating insertion of one end of said connector into one end of a corresponding one of said tubular conductors;
    a smooth electrical contact surface which engages said corresponding conductor;
    a first slot running longitudinally inward from said beveled end; and,
    a second slot perpendicular to said first slot running longitudinally inward from said beveled end, whereby said slots divide said beveled end into quarters and permit it to compress slightly when inserted into said tubular conductor.

4. The system of claim 1 wherein said connectors have ridges on said electrical contact surface.

5. An electrical distribution system comprising in combination:
    a plurality of pre-bussed conduit sections, said pre-bussed conduit sections field-alterable by cutting a section across its length;
    a connector joining two pre-bussed conduit sections;
    each of said pre-bussed conduit sections including;
        a substantially rigid enclosure extending along a longitudinal axis between a first end region and a second end region, said enclosure having a uniform cross-section along its extent;
        a plurality of substantially rigid conductors within said enclosure, said plurality of rigid conductors extending from said first end region of said enclosure to said second end region of said enclosure; each of said plurality of rigid conductors having a uniform cross-section along its extent;
        a plurality of discrete support members for supporting said plurality of rigid conductors within said enclosure in alignment with said longitudinal axis, said discrete support members separating said plurality of rigid conductors one from the other and from said enclosure;

one of said plurality discrete support members disposed in said substantially rigid enclosure adjacent to said first end region with each said plurality of rigid conductors extending from said support member in said first end region;

another of said plurality discrete support members disposed in said substantially rigid enclosure adjacent to said second end region with each of said plurality of rigid conductors extending from said support member in said second end region; and said plurality of rigid conductors forming a pattern that is uniform in cross-section along the length of said section so that said plurality of rigid conductors form a pattern of male connectors on each end of said section and form the same pattern of male connectors if said section is field-altered by cutting the section across its length;

said connector including;

an insulating member supporting a plurality of connecting conductors, each of said connecting conductors having a female member at one end thereof engaging a rigid conductor at one end of one of said plurality of sections and a female member at the other end of said connecting conductor engaging a rigid conductor at one end of another of said plurality of sections; and said connecting conductors arranged in a pattern that maintains separation of said plurality of substantially rigid conductors one from the other and from said enclosure.

6. The system of claim 5 wherein said substantially rigid enclosure is made of an electrically conductive material that can carry a system ground current.

7. The system of claim 5, further including a discrete support member disposed in said substantially rigid enclosure and located intermediate between said first end region and said second end region, said discrete support member comprising:

an electrically insulating support, said electrically insulating support having a first end, as second end, and a plurality of passageways extending longitudinally through said support member from the first end to the second for slidably receiving said rigid conductors, said electrically insulating support being slidable within said rigid enclosure.

8. An electrical distribution system as in claim 5, wherein said enclosure is a thin-wall tube and each of plurality of said conductors is circular in cross-section.

9. An electrical distribution system as in claim 5, wherein said support members seal said rigid enclosure.

10. A section of pre-bussed conduit, field-alterable by cutting the section across its length in order to join it with an additional section of the same construction to form an electrical distribution feeder system; comprising in combination:

a substantially rigid enclosure extending along a longitudinal axis between a first end region and a second end region, said enclosure having a uniform cross-section along its extent;

a plurality of substantially rigid conductors within said enclosure, said plurality of rigid conductors extending from said first end region of said enclosure to said second end region of said enclosure;

each of said plurality of rigid conductors having a uniform cross-section along its extent;

a plurality of discrete support members for supporting said plurality of conductors within said enclosure in alignment with said longitudinal axis, said discrete support members separating said plurality of rigid conductors one from the other and from said enclosure;

one of said plurality discrete support members disposed in said substantially rigid enclosure adjacent to said first end region with each said plurality of rigid conductors extending from said support member in said first end region;

another of said plurality discrete support members disposed in said substantially rigid enclosure adjacent to said second end region with each of said plurality of rigid conductors extending from said support member in said second end region; and said plurality of rigid conductors forming a pattern that is uniform in cross-section along the length of said section so that said plurality of rigid conductors form a pattern of male connectors on each end of said section and form the same pattern of male connectors if said section is field-altered by cutting the section across its length.

11. A section of field-alterable pre-bussed conduit as in claim 10, wherein said enclosure is a thin-wall tube and each of plurality of said conductors is circular in cross-section.

12. A section of field-alterable, pre-bussed conduit as in claim 10, wherein said support members seal said rigid enclosure.

* * * * *